United States Patent
Shieh et al.

(10) Patent No.: US 7,730,878 B2
(45) Date of Patent: Jun. 8, 2010

(54) EXHAUST GAS RECIRCULATION DEVICES

(75) Inventors: Tenghua Tom Shieh, Ann Arbor, MI (US); Naveen Rajan, Ann Arbor, MI (US); Manoj Sampath, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 245 days.

(21) Appl. No.: 11/964,441

(22) Filed: Dec. 26, 2007

(65) Prior Publication Data
US 2009/0165756 A1 Jul. 2, 2009

(51) Int. Cl.
F02B 47/08 (2006.01)
F02B 47/04 (2006.01)

(52) U.S. Cl. .................................. 123/568.17; 701/108

(58) Field of Classification Search ............ 123/568.17, 123/568.15, 568.11, 568.18, 585, 586, 590; 701/108; 60/278, 280, 298, 605.1, 605.2
See application file for complete search history.

(56) References Cited

U.S. PATENT DOCUMENTS

| | | | |
|---|---|---|---|
| 1,432,751 A | 10/1922 | Hallett | |
| 2,354,179 A | 7/1944 | Blanc | |
| 4,393,853 A | 7/1983 | Groves | |
| 4,461,150 A * | 7/1984 | Grohn | 60/605.2 |
| 6,089,019 A | 7/2000 | Roby et al. | |
| 6,267,106 B1 | 7/2001 | Feucht | |
| 6,272,851 B1 * | 8/2001 | Mori et al. | 60/278 |
| 6,343,594 B1 | 2/2002 | Koeslin et al. | |
| 6,425,382 B1 | 7/2002 | Marthaler et al. | |
| 6,427,671 B1 | 8/2002 | Holze et al. | |
| 6,439,212 B1 | 8/2002 | Coleman et al. | |
| 6,494,041 B1 | 12/2002 | Lebold | |
| 6,609,373 B2 | 8/2003 | Coleman et al. | |
| 6,609,374 B2 | 8/2003 | Feucht et al. | |
| 6,640,542 B2 | 11/2003 | Coleman et al. | |
| 6,659,092 B2 | 12/2003 | Coleman et al. | |
| 6,748,741 B2 | 6/2004 | Martin et al. | |
| 6,880,535 B2 | 4/2005 | Sorter et al. | |
| 6,945,237 B1 | 9/2005 | Sullivan et al. | |
| 7,028,680 B2 | 4/2006 | Liu et al. | |
| 7,032,578 B2 | 4/2006 | Liu et al. | |
| 7,104,042 B2 | 9/2006 | Pagot | |
| 7,140,357 B2 | 11/2006 | Wei et al. | |
| 7,243,641 B2 | 7/2007 | Zukouski | |
| 7,281,530 B2 | 10/2007 | Usui | |

(Continued)

FOREIGN PATENT DOCUMENTS

JP 63117124 A 5/1988

(Continued)

*Primary Examiner*—Mahmoud Gimie
(74) *Attorney, Agent, or Firm*—Dinsmore & Shohl LLP

(57) ABSTRACT

Embodiments of an exhaust gas recirculation (EGR) mixing device include an air inlet port and an outlet port disposed at opposite ends of the mixing pipe, an exhaust feeder having a scroll mixing chamber and occupying a portion of the mixing pipe between the air inlet port and the outlet port. The exhaust feeder includes an exhaust feed splitter beam disposed within an open-ended exhaust inlet tube and the scroll mixing chamber, and can be configured to split an exhaust stream into a plurality of exhaust streams before entering the scroll mixing chamber.

7 Claims, 4 Drawing Sheets

U.S. PATENT DOCUMENTS

| | | |
|---|---|---|
| 7,389,770 B2 | 6/2008 | Bertilsson et al. |
| 2003/0111065 A1 | 6/2003 | Blum |
| 2003/0226552 A1 | 12/2003 | Hewkin |
| 2005/0086936 A1 | 4/2005 | Bucknell et al. |
| 2007/0039597 A1 | 2/2007 | Zukouski |
| 2007/0119433 A1 | 5/2007 | Popik et al. |
| 2007/0130948 A1 | 6/2007 | Boehm et al. |

FOREIGN PATENT DOCUMENTS

| | | |
|---|---|---|
| JP | 1195923 A | 8/1989 |
| JP | 4295133 A | 10/1992 |
| JP | 05-044583 | 2/1993 |
| JP | 2000-008967 | 1/2000 |

* cited by examiner

US 7,730,878 B2

EXHAUST GAS RECIRCULATION DEVICES

TECHNICAL FIELD

Embodiments of the present invention are generally related to improved exhaust gas recirculation (EGR) devices, and are specifically related to improved exhaust gas recirculation devices comprising scroll mixers used to facilitate better mixing of air and exhaust.

BACKGROUND

EGR devices are well known in the automotive industry. EGR devices generally mix combustion exhaust with air prior to feeding the mixture into the intake manifold of an internal combustion engine. Mixing exhaust gas increases the specific heat capacity of the air/exhaust mixture, thereby lowering the peak combustion temperature. Lowering the combustion temperature limits the generation of NOx, which is prevalent when nitrogen and oxygen are subjected to high temperatures inside an engine. As a result, there is a continuing demand for improved EGR devices, which reduce combustion temperatures and NOx emissions, and improve overall engine performance.

SUMMARY

According to one embodiment, an exhaust gas recirculation (EGR) mixing device is provided. The EGR mixing pipe comprises an air inlet port disposed at one end of the mixing pipe, an outlet port disposed at an opposite end of the mixing pipe, and an exhaust feeder occupying a portion of the mixing pipe between the air inlet port and the outlet port. The exhaust feeder comprises a scroll mixing chamber comprising a plurality of openings operable for receiving exhaust at multiple locations, and an open-ended exhaust inlet tube disposed on the mixing pipe and configured to deliver exhaust to the scroll mixing chamber, wherein the open-ended exhaust inlet tube receives exhaust at its one end and is coupled to the scroll mixing chamber at its opposite end. The exhaust feeder further comprises an exhaust feed splitter beam disposed lengthwise within a portion of the open-ended exhaust inlet tube and a portion of the scroll mixing chamber, wherein the exhaust feed splitter beam is configured to split an exhaust stream into a plurality of exhaust passages before entering the scroll mixing chamber.

According to a further embodiment, an exhaust gas recirculation (EGR) mixing device comprises: a mixing pipe having an air inlet port disposed at one end of the mixing pipe, an outlet port disposed at an opposite end of the mixing pipe, and an exhaust feeder occupying a portion of the mixing pipe between the air inlet port and the outlet port. The exhaust feeder comprises a scroll mixing chamber comprising a plurality of openings operable for receiving exhaust at multiple locations, and an open-ended exhaust inlet tube disposed on the mixing pipe and configured to deliver exhaust to the scroll mixing chamber, wherein the open-ended exhaust inlet tube receives exhaust at its one end and is coupled to the scroll mixing chamber at its opposite end. The exhaust feeder further comprises an exhaust feed splitter beam disposed lengthwise within a portion of the open-ended exhaust inlet tube and a portion of the scroll mixing chamber, wherein the exhaust feed splitter beam splits the exhaust into first and second passages before entry into the mixing chamber. The second passage defines a greater distance and comprises a wider opening than the first passage.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawing enclosed herewith.

Figure 1A:
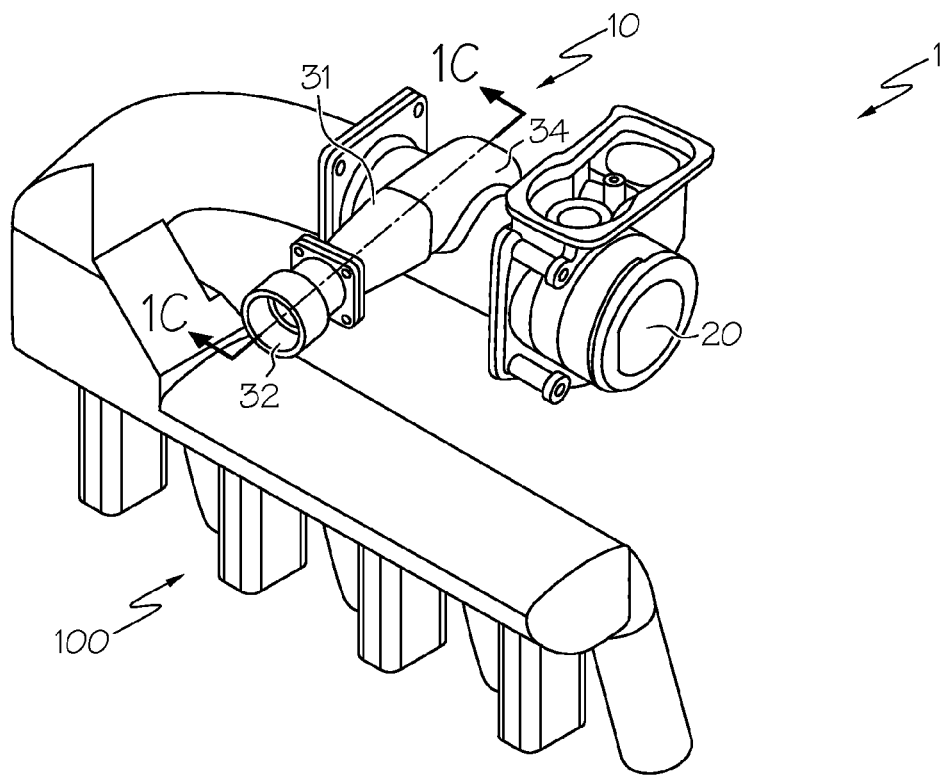
FIG. 1A is a perspective view of an exhaust gas recirculation (EGR) device comprising an EGR mixing pipe according to one or more embodiments of the present invention.

The embodiments set forth in the drawing are illustrative in nature and not intended to be limiting of the invention defined by the claims. Moreover, individual features of the drawings and invention will be more fully apparent and understood in view of the detailed description.

DETAILED DESCRIPTION

The present invention is directed to improved EGR mixing devices, which facilitate enhanced mixing of the air and exhaust (e.g., combustion exhaust from internal combustion engines) prior to entry into the intake manifold. To improve the mixing of air and exhaust, embodiments of the present invention utilize an exhaust feeder which separates exhaust gas into a plurality of exhaust feeds. This enables the exhaust to contact an incoming air feed at multiple locations, thereby providing improved mixing for the air and exhaust prior to delivery to the intake manifold.

Figure 1B:
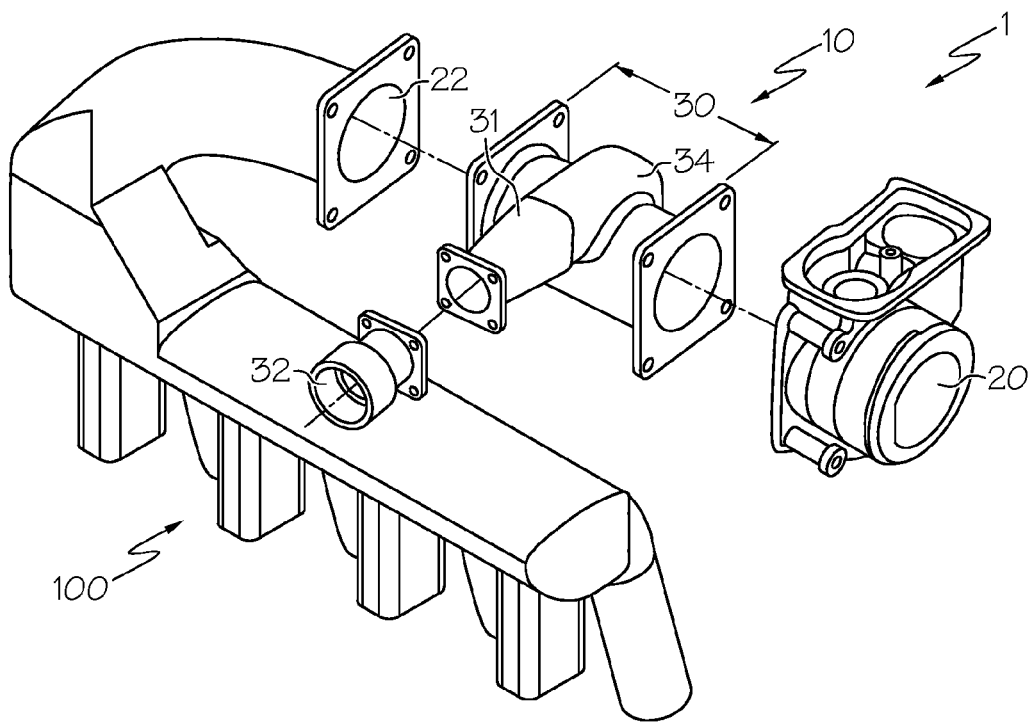
FIG. 1B is the EGR mixing device with the exhaust feeder displayed separate from the mixing pipe according to one or more embodiments of the present invention.
Figure 1C:
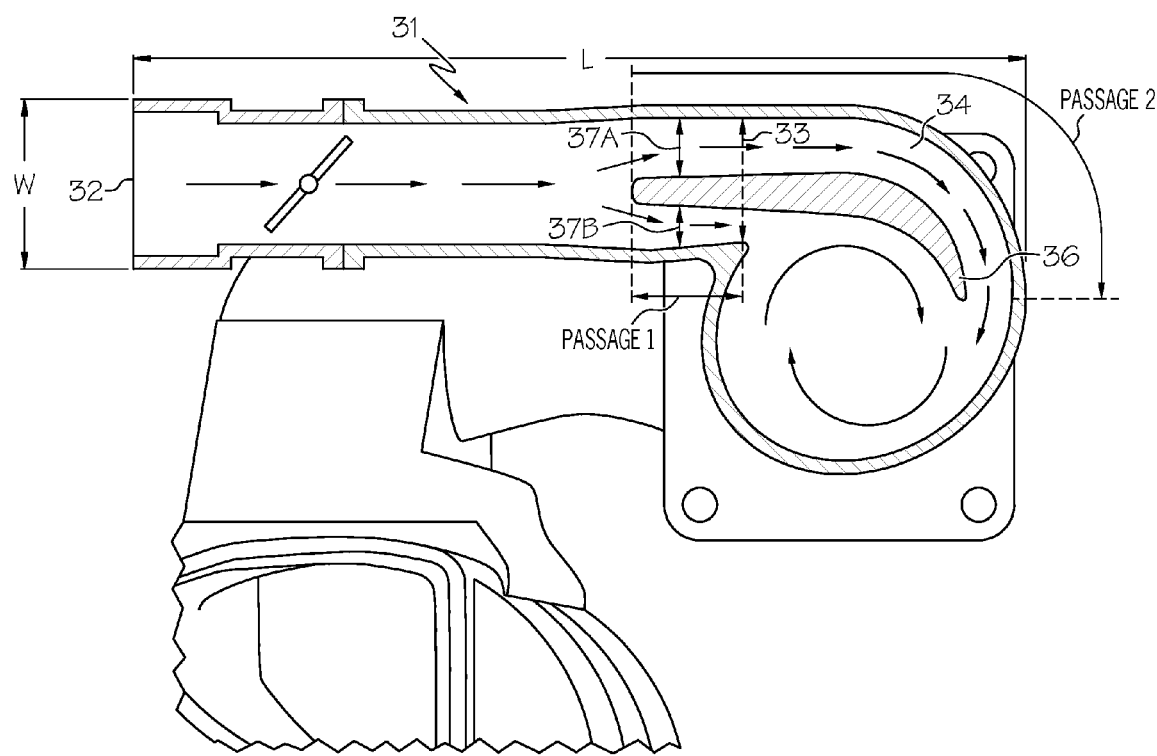
FIG. 1C is a cross-sectional view of the exhaust feeder according to one or more embodiments of the present invention.
Figure 1D:
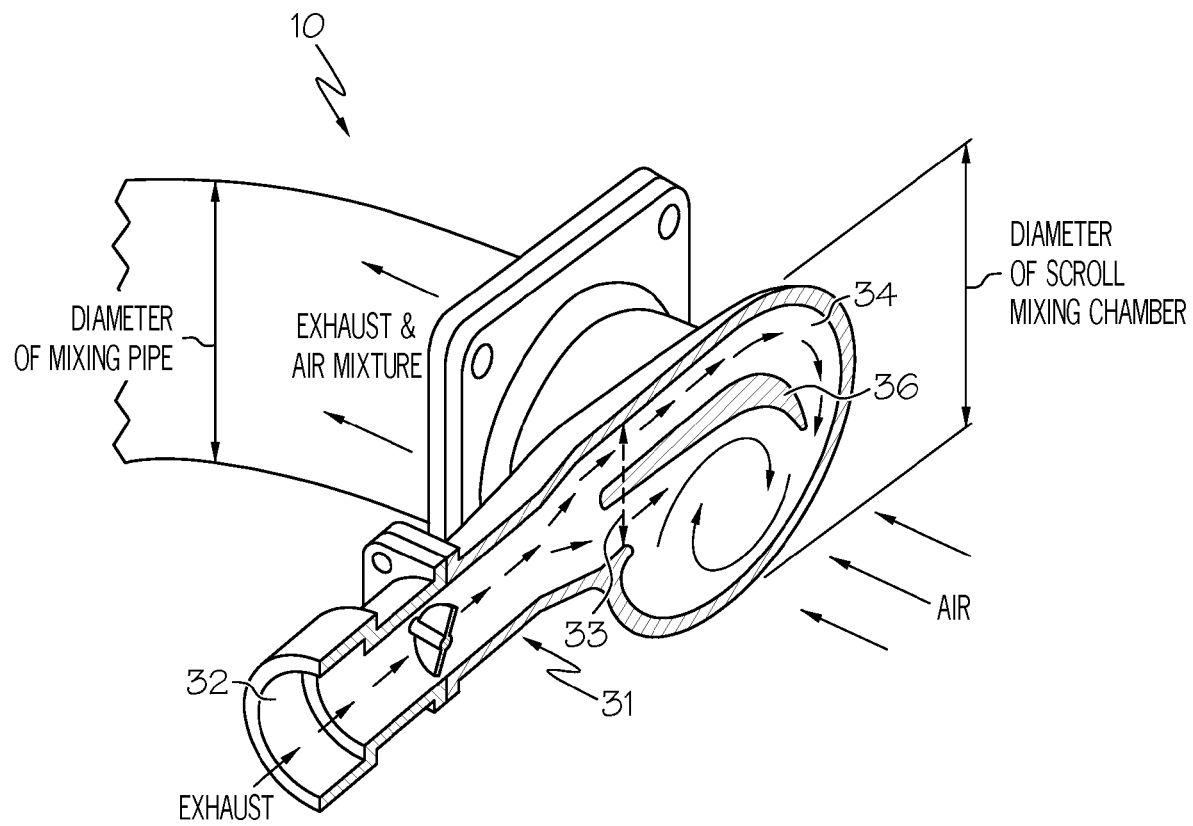
FIG. 1D is a cutaway portion of the EGR mixing pipe which further shows a cross-sectional view of the exhaust feeder according to one or more embodiments of the present invention.
Figure 2:
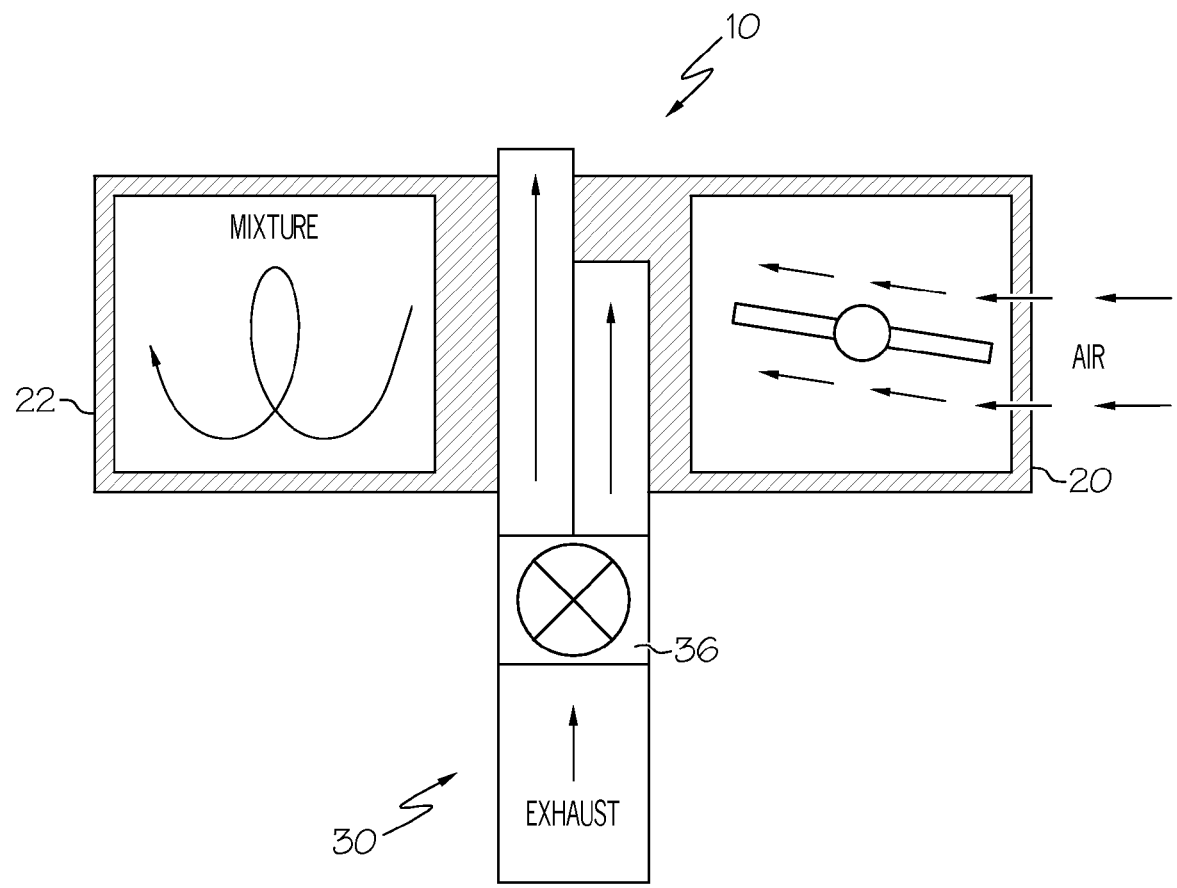
FIG. 2 is a schematic illustration of the EGR mixing pipe according to one or more embodiments of the present invention.

Referring to FIGS. 1A-1D, an EGR mixing device 1 is provided. The mixing device 1 comprises an EGR mixing pipe 10 in communication with an intake manifold 100. The EGR mixing pipe 10 comprises an air inlet port 20 disposed at one end of the mixing pipe 10, and an outlet port 22 disposed at an opposite end of the mixing pipe 10. Referring to FIG. 1B, the mixing pipe 10 further comprises an exhaust feeder 30 occupying a portion of the mixing pipe 10 between the air inlet port 20 and the outlet port 22. In the mixing reaction as shown in FIGS. 1D and 2, air, which is delivered into the inlet port 20, mixes with exhaust delivered through the exhaust feeder 30, and the air/exhaust mixture is outputted through the outlet port 22 of the mixing pipe 10.

Referring to FIG. 1B, the exhaust feeder 30 may comprise an open-ended exhaust inlet tube 31 disposed at least partially around the mixing pipe 10. In one embodiment, the open-ended exhaust inlet tube 31 may extend perpendicularly outward from the mixing pipe 10. As shown in FIG. 1C, the open-ended exhaust inlet tube 31 comprises an end 32 which receives exhaust and an opposite end adjacent scroll mixing chamber 34. The scroll mixing chamber 34 may comprise multiple openings for receiving exhaust, and mixing the exhaust with air. As shown in the embodiment of FIG. 1C, there may openings at the ends of passages 1 and 2. As shown, the scroll mixing chamber 34 may define a substantially cylindrical shape; however, other shapes are contemplated herein. Referring to FIG. 1D, the diameter of the substantially cylindrical scroll mixing chamber 34 is larger than the diameter of the mixing pipe 10 at regions not occupied by the exhaust feeder 30. This larger diameter provides a greater mixing volume for the incoming air to occupy. This also provides greater air surface area in which the exhaust may contact and mix. Thus, the larger diameter of the scroll mixer 34 may increase the mixing area inside the mixing pipe 10.

As shown in the embodiment of FIG. 1C, the splitter 36 is configured to form two exhaust feed passages. In one exemplary embodiment, the opening 37A of passage 2, which extends over the splitter 36, may be greater than the opening 37B of the passage 1. This compensates for the fact that the exhaust in passage 2 must travel a greater distance before reaching the portion of the mixing chamber 34, which receives the air feed. For example, the opening 37A of passage 2 may define at least twice the area of opening 37B of passage 1. In one exemplary embodiment, the opening 37A may comprise an area of 830 mm$^2$, whereas opening 37B may comprise an area of 360 mm$^2$. As shown in FIG. 1C, passage areas may increase or decrease along the length of passage. For example, the beginning of passage 1 may define a 12 mm×30 mm opening, whereas the end of passage 1 may define a 10 mm×30 mm opening.

Further as shown in FIG. 1C, the exhaust feeder 30 may comprises an exhaust feed splitter beam 36 disposed lengthwise within the open-ended exhaust inlet tube 31 and the scroll mixing chamber 34. This configuration allows the exhaust stream to be split into two or more exhaust streams or exhaust regions before entering the scroll mixing chamber 34. In addition to its lengthwise extension, the exhaust feed splitter beam 36 may extend widthwise such that opposite edges of the splitter beam 36 contact the open-ended exhaust inlet tube 31 and the scroll mixing chamber 34. For embodiments comprising a cylindrical scroll mixing chamber 34, the splitting beam 36 may be curved to adjust to the contours of the scroll mixer 34, as shown in FIGS. 1C and D. However, it should be understood that any dimension of a splitter beam can be utilized with the present invention.

The EGR devices described herein increase turbulence of the air/exhaust mixture as a result of the configuration of the cylindrical scroll mixing chamber 34 extending at least partially around the mixing pipe 10, with the inner disposed splitting beam 36. Particularly, referring to FIG. 1D, exhaust entering exhaust delivery end 32 is split so that a certain portion of exhaust travels directly into the air flow, while another portion of exhaust travels around the circumference of mixing pipe 10 and above splitting beam 36. The portion of exhaust traveling around circumference of mixing pipe tends to agitate in the incoming air flow to provide a better mixing of the air/exhaust.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An exhaust gas recirculation (EGR) mixing device comprising a mixing pipe having an air inlet port disposed at one end of the mixing pipe, an outlet port disposed at an opposite end of the mixing pipe, and an exhaust feeder occupying a portion of the mixing pipe between the air inlet port and the outlet port, wherein the exhaust feeder comprises:

a scroll mixing chamber disposed on the mixing pipe and configured to mix air and exhaust, the scroll mixing chamber comprising a plurality of openings operable for receiving exhaust at multiple locations;

an open-ended exhaust inlet tube disposed on the mixing pipe and configured to deliver exhaust to the scroll mixing chamber, wherein the open-ended exhaust inlet tube receives exhaust at its one end and is coupled to the scroll mixing chamber at its opposite end; and a continuous curved exhaust feed splitter beam disposed lengthwise within a portion of the open-ended exhaust inlet tube and a portion of the scroll mixing chamber and defining a non-uniform thickness across its length, wherein the exhaust feed splitter beam splits the exhaust into first and second passages before entry into the mixing chamber, wherein the second passage defines a greater distance and comprises a wider opening than the first passage, and wherein the second passage defines a uniform passage diameter throughout.

2. The EGR mixing device of claim 1 wherein the open-ended exhaust inlet tube extends perpendicularly outward from the mixing pipe.

3. The EGR mixing device of claim 1 wherein the scroll mixing chamber defines a substantially cylindrical shape.

4. The EGR mixing pipe of claim 3 wherein the diameter of the substantially cylindrical scroll mixing chamber is larger than the diameter of the pipe at regions not occupied by the exhaust feeder.

5. The EGR mixing pipe of claim 1 wherein the splitting beam is curved.

6. A vehicle comprising:
   a vehicle frame
   an internal combustion engine having an intake manifold; and
   the exhaust gas recirculation (EGR) mixing device of claim 1 in communication with the intake manifold.

7. The EGR mixing pipe of claim 1 wherein the opening of the second passage is at least twice the width of the opening of the first passage.

* * * * *